US012681796B2

(12) United States Patent
Mishra et al.

(10) Patent No.: US 12,681,796 B2
(45) Date of Patent: Jul. 14, 2026

(54) LOCAL PROTECT IMAGE FOR CRITICAL APPLICATIONS

(71) Applicant: Rakuten Symphony, Inc., Tokyo (JP)

(72) Inventors: Ashok Kumar Mishra, San Jose, CA (US); Ramendra Pratap Singh, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/247,233

(22) PCT Filed: Dec. 14, 2022

(86) PCT No.: PCT/US2022/052868
§ 371 (c)(1),
(2) Date: Mar. 29, 2023

(87) PCT Pub. No.: WO2024/129079
PCT Pub. Date: Jun. 20, 2024

(65) Prior Publication Data
US 2025/0298683 A1 Sep. 25, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01)

(58) Field of Classification Search
CPC ............. G06F 11/0793; G06F 11/0709; G06F 11/1438
See application file for complete search history.

(56) References Cited

U.S. PATENT DOCUMENTS

| | | | |
|---|---|---|---|
| 8,299,944 B2 | 10/2012 | Provenzano | |
| 8,688,642 B2 | 4/2014 | Manmohan | |
| 8,990,608 B1 * | 3/2015 | Gupta | G06F 11/2028 |
| | | | 714/3 |
| 9,251,198 B2 | 2/2016 | Mutalik | |
| 9,298,392 B2 | 3/2016 | Hsu | |
| 9,329,941 B2 | 5/2016 | Liu | |
| 9,563,683 B2 | 2/2017 | Abercrombie | |
| 9,772,916 B2 | 9/2017 | Rangasamy | |
| 10,055,424 B2 | 8/2018 | Mortensen | |
| 10,061,658 B2 | 8/2018 | Long | |
| 11,409,588 B1 | 8/2022 | Tiwari et al. | |
| 2007/0168495 A1 | 7/2007 | Rothstein | |
| 2008/0243879 A1 | 10/2008 | Gokhale | |
| 2015/0227601 A1 | 8/2015 | Ramu | |
| 2018/0054314 A1 | 2/2018 | Edwards | |
| 2019/0102265 A1 * | 4/2019 | Ngo | H04L 67/1034 |

(Continued)

*Primary Examiner* — Philip Guyton
(74) *Attorney, Agent, or Firm* — David R. Stevens; Stevens Law Group

(57) ABSTRACT

A critical executable image is used to instantiate an instance on a computing device. The executable image is further saved on the storage device. In response to a failure of the instance, the instance may be restored from the locally stored executable image. The executable image may be of a container and corresponding application image. The computing device may receive a specification, e.g., container specification, to instantiate the instance, the specification including an annotation instructing the computing device to locally store the executable image after instantiation.

12 Claims, 6 Drawing Sheets

(56)        References Cited

U.S. PATENT DOCUMENTS

2019/0347127  A1*  11/2019  Coady ...................... G06F 8/63
2020/0082095  A1    3/2020  Mcallister et al.
2020/0241754  A1*  7/2020  Bett ........................ G06F 3/067
2020/0272488  A1    8/2020  Strode, Jr. et al.
2021/0064442  A1*  3/2021  Alluboyina ........... G06F 9/5011
2021/0109823  A1*  4/2021  King ................... G06F 11/1458
2022/0068421  A1*  3/2022  Thommana ............ G11C 29/38
2022/0229804  A1    7/2022  Wu et al.
2024/0126582  A1*  4/2024  Jigalur ................ G06F 9/45558

* cited by examiner

LOCAL PROTECT IMAGE FOR CRITICAL APPLICATIONS

BACKGROUND

Field of the Invention

This invention relates to providing a local protect image for critical applications.

Background of the Invention

Many computing installations are extremely complex and require many components executing on many different host computing devices to operate and interoperate correctly. Tools may be used to automatically manage an installation and perform tasks such as monitoring, scaling up, scaling down, and handling failures. Some components of a computing installation are particularly critical such that constant availability should be provided.

It would be an advancement in the art to facilitate the availability of critical components of a computing installation.

SUMMARY OF THE INVENTION

An apparatus includes a computing device including one or more processing devices and one or more memory devices operably coupled to the one or more processing devices. The one or more memory devices store executable code that, when executed by the one or more processing devices, causes the one or more processing devices to receive an instruction to instantiate an instance from an executable image, the instruction including an annotation. The instance is instantiated from the executable image. In response to the annotation, the executable image is stored on a storage device coupled to the one or more processing devices after instantiating the instance from the executable image.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
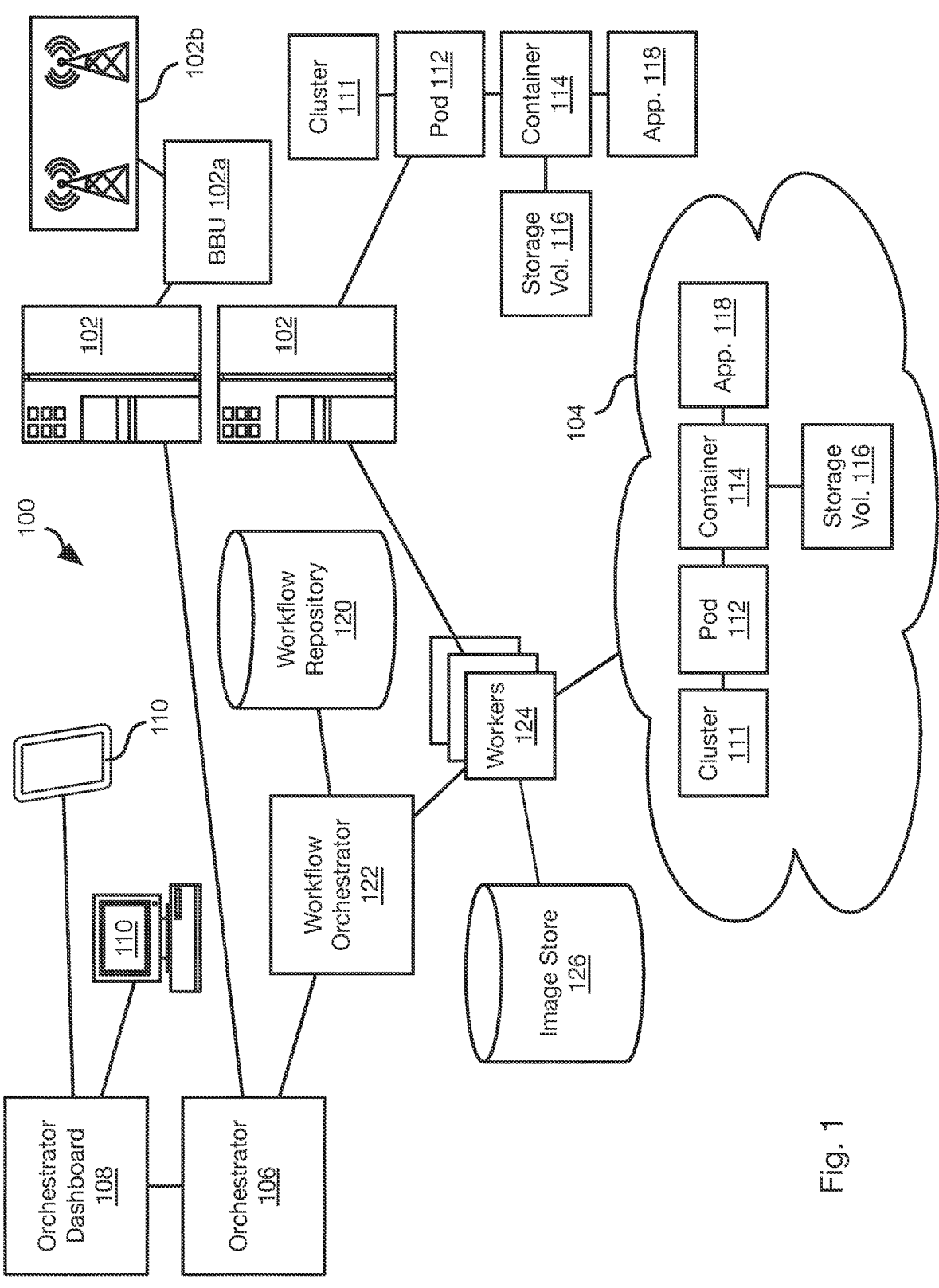
FIG. 1 is a schematic block diagram of a network environment in which a complex application may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 500 of FIG. 5.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No.

16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
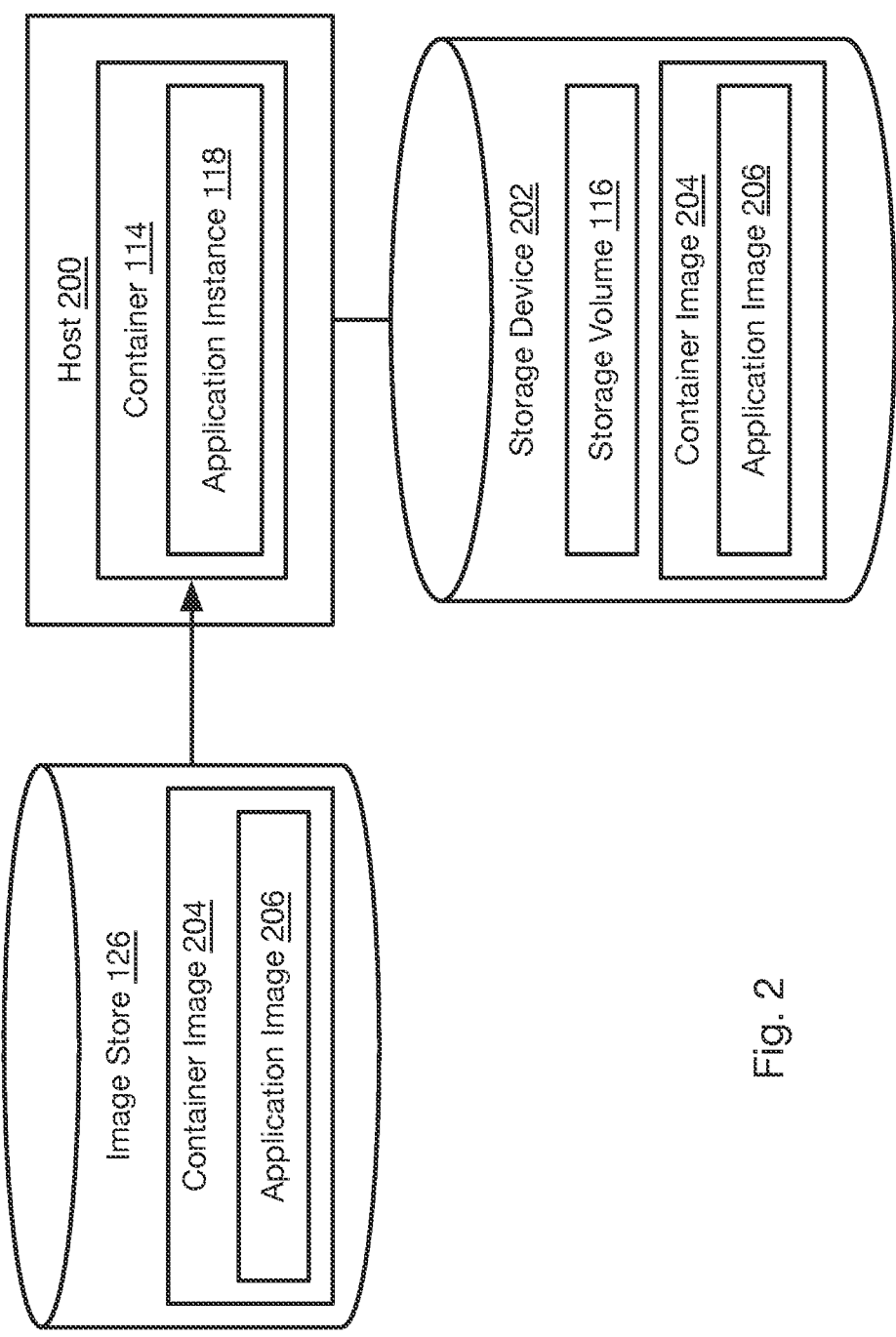
FIG. 2 is a schematic block diagram showing components for providing a local protect image in accordance with an embodiment.

Referring to FIG. 2, a host 200 may be a server 102, a unit of computing resources on the cloud computing platform 104, a virtual machine, or other computing device. A host 200 may have one or more storage devices 202 mounted thereto. Each storage device 202 may be implemented as a hard disc drive (HDD), solid state drive (SSD), or other type of persistent storage device. A storage device 202 may be physically mounted to a host 200 or may be coupled to the host 200 by a network.

A container 114 and corresponding application instance 118 may be instantiated on a host 200, such as by a pod 112 for the host 200. The container 114 and application instance 118 may be instantiated from a container image 204 including an application image 206. The container image 204 may be retrieved from the image store 126. The storage device 202 may store a storage volume 116 that is mounted to the container 114 and is accessed by the application instance 118.

For critical applications instances 118, the container image 204, including the application image 206, may also be written to the storage device 202 to provide a local protect image for rapid recovery. In this manner, the container 114 and application instance 118 may be restored from the storage device 202 without the delay caused by requesting and transmitting the container image 204 and application image 206. Likewise, the container 114 and application instance 118 may be restored in the absence of a network connection to the image store 126.

A critical application instance 118 may be identified in various ways. For example, an administrator may input an explicit designation of the application instance 118 as critical. An application instance 118 may be designated as critical where the application instance 118 lacks redundancy. For example, where the application instance 118 has no other application instances 118 that provide the same function, such as in a load balancing arrangement or where the number of other application instances 118 in the load balancing arrangement is below a threshold number.

An application instance 118 may be designated as critical where many other components of the cluster are dependent thereon. For example, an application instance 118 may be deemed critical if the application instance 118 has the greatest number of dependencies for the cluster 111, has a number of dependencies exceeding a threshold amount, or is one of the N application instances 118 of the cluster 111 with the highest number of dependencies, where N is a predefined integer.

Dependencies may be in the form of application sessions to the application instance 118, network connections to the application instance 118, environmental variables of components referring to the application instance 118, or other dependencies. Dependencies may include indirect dependencies. A component that is dependent on a component that is dependent on the application instance 118 may be deemed dependent on the application instance 118.

Dependencies may be determined by examining observability data such as log files, metrics, events, alerts, inventory, and other data that may record a dependency of a component on the application instance 118. Dependencies may also be defined in the manifest ingested by the orchestrator 106 when instantiating cluster and may therefore be derived from the manifest.

Figure 3:
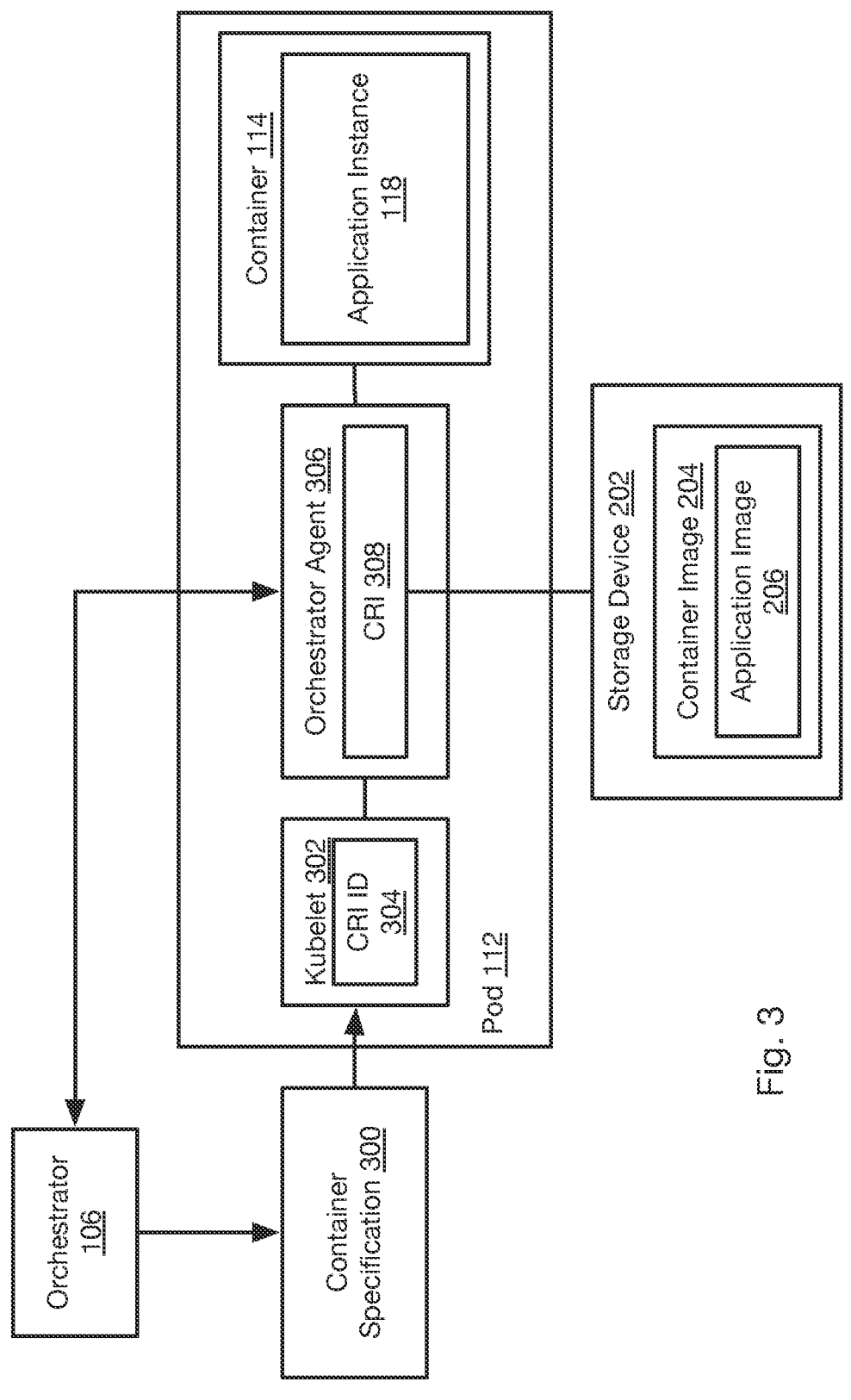
FIG. 3 is process flow diagram of a components for instantiating from a local protect image in accordance with an embodiment.

FIG. 3 illustrates an approach for storing a local copy of the container image 204 and application image 206 in the storage device of a host 200 executing the container 114 and application instance 118 instantiated from the container image 204 and application image 206.

The orchestrator 106 may provide a container specification 300 to a pod 112, e.g., to a KUBERNETES Kubelet 302 implementing the pod 112. The Kubelet 302 may function as a logical host for one or more containers 114 of the pod 112. The pod 112 may include a set of namespaces, a file system (e.g., built on a storage volume 116), or other data structures that are shared by containers 114 belonging to the pod 112.

The container specification 300 may include the container image 204 and application image 206 or may include an identifier of one or both of the container image 204 and application image 206. The container specification 300 may include an annotation indicating that the container image 204 and the application image 206 are to be locally stored in the storage device 202.

In response to receiving the container specification, the Kubelet 302 may call a container runtime interface (CRI). A CRI is an executable corresponding to a particular type of container 114 and configured to perform tasks for that type of container 114, such as instantiating the container 114, suspending the container 114, pausing the container 114, de-instantiating the container, loading the application instance 118 into the container 114, or performing other tasks with respect to the container 114.

For example, the Kubelet 302 may be configured with a CRI identifier 304, e.g., a pointer, path name, or other reference, that will be used by the Kubelet 302 to invoke CRI functions. In some embodiments, the CRI identifier 304 may refer to an orchestrator agent 306 that implements a CRI 308 as well as being configured to coordinate with the orchestrator 106 to perform actions beyond those performed by a conventional CRI.

For example, the Kubelet 302 may instruct the orchestrator agent 306 to instantiate the container 114 and application instance 118 in response to receiving the container specification 300. The Kubelet 302 may pass the annotation to the orchestrator agent 306. The orchestrator agent 306 may then instantiate the container 114 and application instance 118 by either using the container image 204 and application image 206 included in the container specification or retrieving the container image 204 and application image 206 from the image store 126 using one or more identifiers included in the container specification 300.

In response to the annotation, the orchestrator agent 306 further stores a copy of the container image 204 and application image 206 in the storage device 202 of the host 200 executing the pod 112.

In one approach, the container image 204 and application image 206 are stored in the storage device 202 before the container specification 300 is received. For example, the orchestrator 106 may communicate with the orchestrator agent 306 in bypass of the Kubelet 302 and instruct the orchestrator agent 306 to retrieve the container image 204 and application image 206 and store them in the storage device 202. The orchestrator 106 may then transmit the container specification 300 to the Kubelet 302, the container specification directing the Kubelet 302 to instantiate the container 114 and application instance 118 from the copy of the container image 204 and application image 206 on the storage device 202.

In some embodiments, the orchestrator agent 306 may be omitted: the orchestrator 106 invokes transfer of the container image 204 and application image 206 to the storage device 202 directly, such as using a remote command line interface (e.g., secure shell (SSH)) or other remote procedure call. The orchestrator 106 may then transmit the container specification 300 to the Kubelet 302, the container specification directing the Kubelet 302 to instantiate the container 114 and application instance 118 from the copy of the container image 204 and application image 206 on the storage device 202. The Kubelet 302 may then call a CRI to instantiate the container 114 and application instance 118 from the copy of the container image 204 and application image 206 on the storage device 202 without using an orchestrator agent 306.

If the container 114 fails or the host 200 is restarted, the Kubelet 302 may again read the specification 300 and instruct the orchestrator agent 306 to instantiate the container 114 and application instance 118 from the copy of the container image 204 and application image 206 on the storage device 202. The round-trip time required to request and retrieve the container image 204 and application image 206 is therefore avoided. Likewise, the container 114 and application instance 118 may be restored even when there is no network connection between the host 200 and the image store 126 or the image store 126 is otherwise unavailable.

Figure 4A:
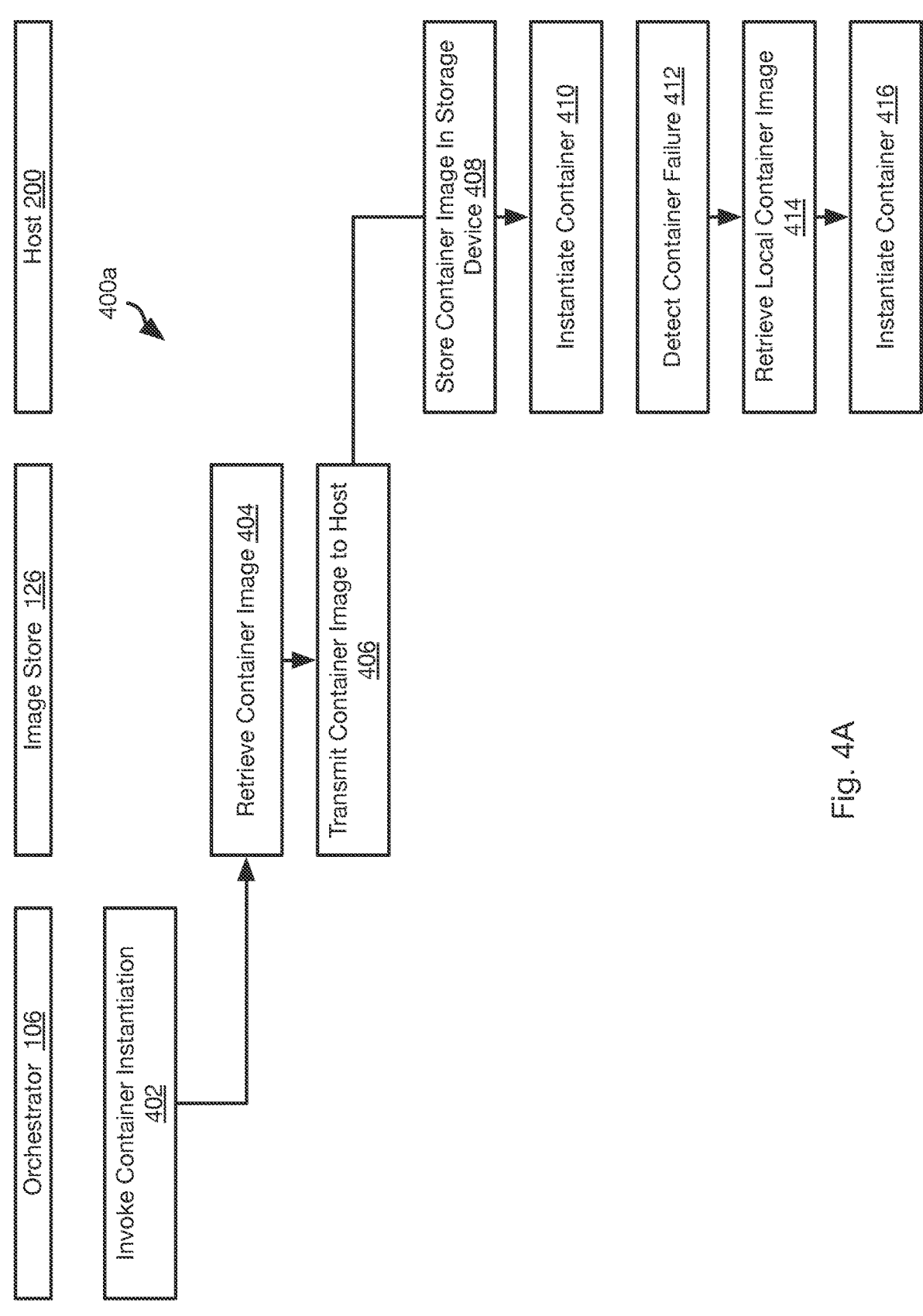
FIG. 4A is a process flow diagram of a method for creating and using a local protect image in accordance with an embodiment.

FIG. 4A illustrates a method 400a for creating a local protect image for a container image 204 and application image 206. The method 400a may be preceded by a determination that the container 114 and application instance 118 to be instantiated are critical as described above.

The method 400a may include the orchestrator 402 invoking container instantiation in a pod 112, such as by transmitting a container specification 300 to the Kubelet 302 of the pod 112. The container image 204 (which includes the application image 206) referenced by the container specification is retrieved 404 from the image store 126 and transmitted 406 by the image store 126 to the host 200 of the pod 112 either directly or by way of some other entity, such as the orchestrator 106 or some other component. The container image 204 may be retrieved by the orchestrator 106 and transmitted with the container specification 300, requested by the Kubelet 302 from the image store 126 in response to the container specification 300, or requested by the orchestrator agent 306 from the image store 126 in response to the annotation to the container specification 300.

A component executing on the host 200 may then store 408 the container image 204 on a storage device 202 of the host 200. The orchestrator agent 306 may store the container image 204 on the storage device as may the Kubelet 302 itself or the orchestrator 106.

A component executing on the host 200 may then instantiate 410 the container 114, including the application instance 118 hosted by the container 114, using the container image 204. The container 114 and application instance 118 may be instantiated 410 by the orchestrator agent 306, a CRI, or some other component. The container 114 and application instance 118 may then commence operating to perform tasks the application instance 118 is programmed to perform.

The method 400a may further include detecting 412 failure of any of the container 114, the application instance 118, the pod 112, or the host 200 itself. In the case of failure of the host 200, failure may be detected by the cluster 111 or the orchestrator 106, such as using a monitoring workflow from the workflow repository 120. Failure of the host 200 may be detected by a component on the host 200, e.g., the Kubelet 302 or orchestrator agent 306, detecting restarting of the host 200.

In response to detecting 412 failure, a component executing on the host 200 may then retrieve 414 the container image 204 from the storage device 202 and instantiate 416 the container 114 and corresponding application instance 118 using the container image 204. Instantiating 416 may be performed by the orchestrator agent 306 independently or upon being invoked as the CRI of the Kubelet 302. Instantiating 416 may also be invoked by the orchestrator 106 in response to detecting 412 failure.

Figure 4B:
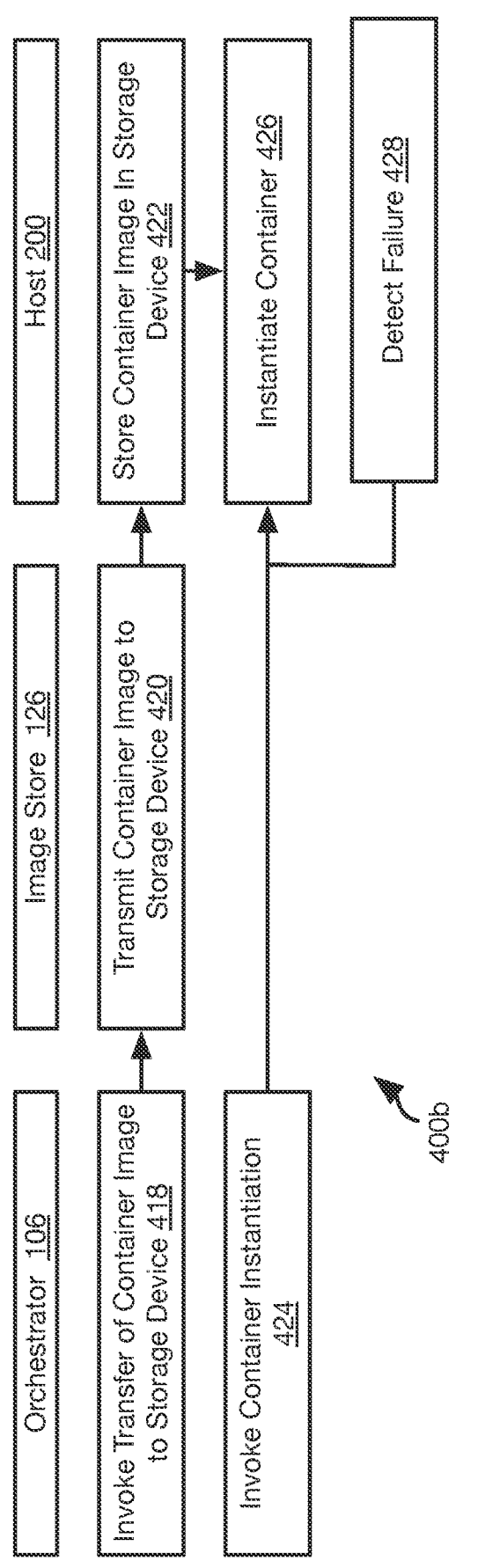
FIG. 4B is a process flow diagram of an alternative method for creating and using a local protect image in accordance with an embodiment.

FIG. 4B is an alternative method 400b that may be used for creating a local protect image for a container image 204 and application image 206. The method 400b may be performed without the use of an orchestrator agent 306.

In the method 400b, the orchestrator invokes 418 transfer of the container image 204, by the image store 126, to a storage device 202 of a host 200. The image store 126 then transmits 420 the container image 204 to the host 200 and causes the host 200 to store 422 the container image 204 on the storage device 202. For example, a workflow form the workflow repository 120 may be used to achieve storage of the container image 204 on the storage device 202. For example, the workflow may use a remote command line interface (CLI), such as SSH, to transfer and store the container image 204 on the storage device 202.

The orchestrator 424 may then invoke 424 a component on the host 200, such as the Kubelet 302, to instantiate the container 114 and application instance 118 from the previously-stored container image 204. The component then instantiates 426 the container 114 and application instance 118 from the container image 204 stored on the storage device 202. For example, the Kubelet 302 may call a CRI to instantiate the container 114 and application instance 118.

In the event a failure is detected 428, re-instantiating the container 114 and application instance 118 may be performed by repeating steps 424-426. For example, the orchestrator 106 may invoke 426 container instantiation in response to detecting failure and restarting of the host 200. In some scenarios, the Kubelet 302 may invoke the CRI without an instruction from the orchestrator 106, such as in view of a previously received container specification 300 instructing instantiation of the container 114 and application instance from the container image 204 stored on the storage device 202. For example, the Kubelet 302 may do so in response to failure of the container image 204 or upon starting up after restarting of the host 200 following failure or other event.

In yet another alternative to the methods 400a, 400b, the local protect image stored on the storage device 202 may be stored at some point following instantiation of the container 114 and application instance 118. For example, rather than deleting the container image 204 following instantiation, the orchestrator agent 306 or some other component may store the container image 204 on the storage device 202 and configure the Kubelet 302 to use the container image 204 to recover from failure of the host 200, container 114, and/or application instance 118.

Figure 5:
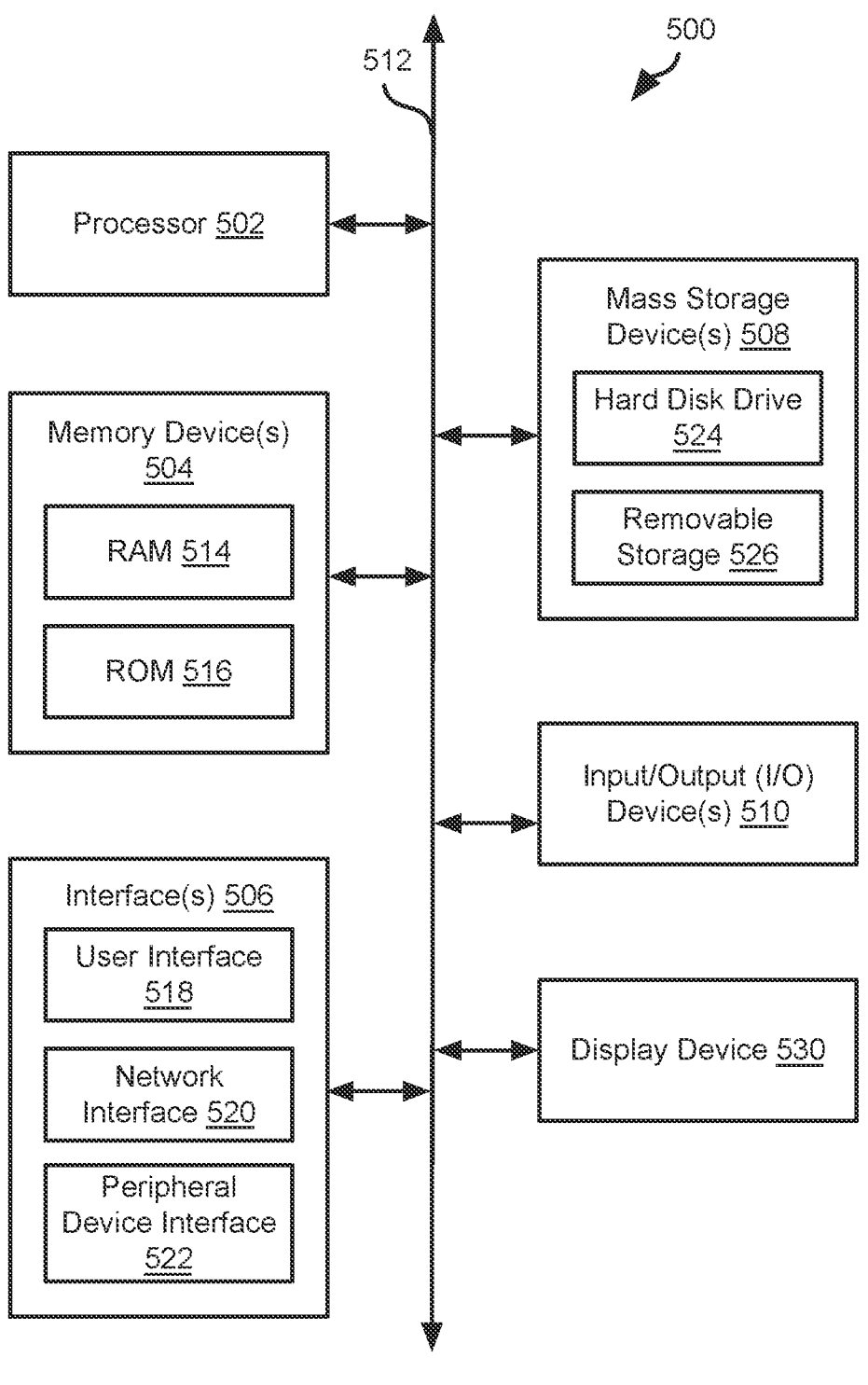
FIG. 5 is a schematic block diagram of an example computing device suitable for implementing methods in accordance with embodiments of the invention.

FIG. 5 is a block diagram illustrating an example computing device 500. Computing device 500 may be used to perform various procedures, such as those discussed herein. The servers 102, orchestrator 106, workflow orchestrator 122, and cloud computing platform 104 may each be implemented using one or more computing devices 500. The orchestrator 106 and workflow orchestrator 122 may be implemented on different computing devices 500 or a single computing device 500 may execute both of the orchestrator 106 and workflow orchestrator 122.

Computing device 500 includes one or more processor(s) 502, one or more memory device(s) 504, one or more interface(s) 506, one or more mass storage device(s) 508, one or more Input/output (I/O) device(s) 510, and a display device 530 all of which are coupled to a bus 512. Processor (s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures des bed herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:

a computing device including one or more processing devices and one or more memory devices operably coupled to the one or more processing devices, the one or more memory devices storing executable code that, when executed by the one or more processing devices, causes the one or more processing devices to:

receive an instruction from an orchestrator to instantiate an instance from an executable image;

in response to the instruction, instantiate the instance from the executable image by, passing the instruction to a container runtime interface (CRI) to instantiate the instance from the executable image, the CRI being an agent of the orchestrator;

in response to passing of the instruction, perform, by the CRI:

retrieve the executable image from an image store;

instantiate the instance from the executable image;

evaluate whether the instruction includes an annotation indicating that the executable image is to be locally stored on a persistent storage device coupled to the one or more processing devices after instantiating the instance from the executable image; and in response to the annotation indicating that the executable image is to be locally stored on the persistent storage device after instantiating the instance from the executable image, store the executable image on the persistent storage device after instantiating the instance from the executable image; and in response to a detected failure, re-instantiate the instance from the executable image on the persistent storage device.

2. The apparatus of claim 1, wherein the detected failure is failure of the instance.

3. The apparatus of claim 1, wherein the detected failure is failure of the computing device.

4. The apparatus of claim 1, wherein the instance is a container executing an application instance.

5. The apparatus of claim 4, wherein the instruction is a container specification.

6. The apparatus of claim 1, wherein the computing device is part of a cloud computing platform.

7. A method comprising:

receiving, by a computer system including one or more processing devices and a persistent storage device coupled to the one or more processing devices, from an orchestrator, an instruction to instantiate an instance from an executable image, the instruction including an annotation indicating that the executable image is to be locally stored on the persistent storage device after instantiating the instance from the executable image;

instantiating, by the computer system, the instance from the executable image by passing the instruction to a container runtime interface (CRI) to instantiate the instance from the executable image, the CRI being an agent of the orchestrator;

in response to passing of the instruction, performing, by the CRI:

retrieving the executable image from an image store;

instantiating the instance from the executable image;

evaluating whether the instruction includes the annotation indicating that the executable image is to be locally stored on the persistent storage device after instantiating the instance from the executable image; and in response to the annotation indicating that the executable image is to be locally stored on the persistent storage device after instantiating the instance from the executable image, store the executable image on the persistent storage device after instantiating the instance from the executable image; and in response to a detected failure, re-instantiating, by the computer system, the instance from the executable image on the persistent storage device.

8. The method of claim 7, wherein the detected failure is failure of the instance.

9. The method of claim 7, wherein the detected failure is failure of the computer system.

10. The method of claim 7, wherein the instance is a container executing an application instance.

11. The method of claim 10, wherein the instruction is a container specification.

12. The method of claim 7, wherein the computer system is part of a cloud computing platform.

* * * * *